United States Patent [19]
Weiland

[11] Patent Number: 5,195,602
[45] Date of Patent: Mar. 23, 1993

[54] STABILIZED AIR CUSHION VEHICLE

[76] Inventor: Carl W. Weiland, 1769 Golfridge Dr., Bloomfield Hills, Mich. 48302

[21] Appl. No.: 736,637

[22] Filed: Jul. 26, 1991

[51] Int. Cl.$^5$ ............................................... B60V 1/12
[52] U.S. Cl. ..................................... 180/118; 180/121
[58] Field of Search .............. 180/126, 121, 116, 117, 180/118

[56] References Cited

U.S. PATENT DOCUMENTS

| | | | |
|---|---|---|---|
| 3,373,836 | 3/1968 | Chaplin | 180/118 |
| 3,412,956 | 11/1968 | Cockerell | 180/118 X |
| 3,438,457 | 4/1969 | Guienne et al. | 180/121 |
| 3,563,333 | 2/1971 | Beardsley | 180/118 |
| 3,811,527 | 5/1974 | Pont et al. | 180/121 |
| 3,826,330 | 7/1974 | Midolo et al. | 180/116 |

Primary Examiner—Margaret A. Focarino
Assistant Examiner—Kevin Hurley
Attorney, Agent, or Firm—Cushman, Darby & Cushman

[57] ABSTRACT

An air cushion vehicle has a substantially-endless downward and inward directed rigid primary nozzle supplied with air under pressure for producing an air curtain that creates and confines a central primary air cushion beneath the vehicle which mainly supports it. The vehicle also has at least two substantially-endless downward and inward directed rigid secondary nozzles arranged on generally opposite sides of the primary nozzle and each supplied with air under pressure for producing an air curtain that creates and confines a stabilizing air cushion beneath the vehicle smaller than the primary air cushion. The two stabilizing cushions are preferably of the same size and shape and each smaller than the primary cushion. When the vehicle leans or dips toward one of the stabilizing cushions when travelling over a surface, e.g. land or water, the pressure of that one stabilizing cushion increases and tends to push the vehicle back up to a level position.

13 Claims, 2 Drawing Sheets

STABILIZED AIR CUSHION VEHICLE

FIELD OF THE INVENTION

This invention relates to an air cushion vehicle adapted to travel over the surfaces of water or ground. More particularly, this invention relates to simple, inexpensive means for stabilizing such a vehicle, that is to right it if it tilts while so traveling.

BACKGROUND OF THE INVENTION

If the surface over which an air cushion vehicle travels is uneven, the vehicle may pitch or roll or undergo a combination of both motions. Such motions may even become extreme depending on surface unevenness, vehicle speed, etc.

The problem was recognized and attempts made to solve it in the prior art. Thus Pont et al U.S. Pat. No. 3,811,527, May 21, 1974, discloses an air cushion vehicle having means for creating a central or main air cushion including a surrounding flexible skirt and compartmental peripheral cushions including a flexible skirt surrounding each peripheral cushion which are all arranged about the periphery of the central cushion. The skirt surrounding the central cushion may be common to both it and the peripheral cushions. The supply of air to the several cushions is variable independently as to each cushion to control the attitude of the vehicle and-/or "the angular speeds of pitch and roll . . . to improve the comfort of the passengers, the performance of the vehicle and the behavior of the skirts."

Jaumotte U.S. Pat. No. 3,587,772 Jun. 28, 1971, discloses an air cushion vehicle having two or more air cushions arranged in line longitudinally and/or transversely of the vehicle and spaced inwardly of the periphery thereof to provide a "first lifting stage". Each cushion is created by an endless channel-like inward directed nozzle supplied with an independent source of air under pressure, the lower ends of the nozzle being defined by flexible skirts. Depending from the periphery of the vehicle is a flexible skirt which depends lower than the skirts of the air cushions and surrounds all those cushions to receive air therefrom and provide a "second lifting stage".

The air cushion vehicles of both of the above referred to patents, however, have flexible skirts surrounding their several air cushions and also rather complicated constructions, especially that of Pont. The disadvantages of flexible skirts are well known.

BRIEF SUMMARY OF THE INVENTION

Accordingly it is an object of this invention to provide an air cushion vehicle with simple, inexpensive means to stabilize it against pitch and roll and/or against a combination of such motions. This object is accomplished by providing the vehicle with means to create a central or primary air cushion including a substantially endless channel-like rigid nozzle directed inward beneath the vehicle and supplied with air under pressure to form an air curtain which creates and contains the central air cushion. The vehicle also has a means to create at least two stabilizing air cushions smaller than the primary cushion and arranged in line on opposite sides thereof. That means includes a substantially endless channel-like, inward directed, rigid nozzle supplied with air under pressure from the same source that supplies the central cushion to form an air curtain which creates and contains the corresponding stabilizing cushion. The mouths of the nozzles of both the central and stabilizing air cushions are on the same level. If the vehicle is elongated, the two stabilizing cushions may be arranged in line longitudinally of the vehicle to stabilize it against pitch, in line transversely to stabilize it against roll, or four such cushions may be arranged, generally symmetrically about longitudinal and transverse axes of the vehicle, to stabilize it against both pitch and roll or any combination thereof.

DETAILED DESCRIPTION OF THE INVENTION

The invention will now be described with reference to an air cushion boat, but it will be realized that the invention is equally applicable to an air cushion land vehicle or to an air cushion amphibious vehicle.

Figure 1:
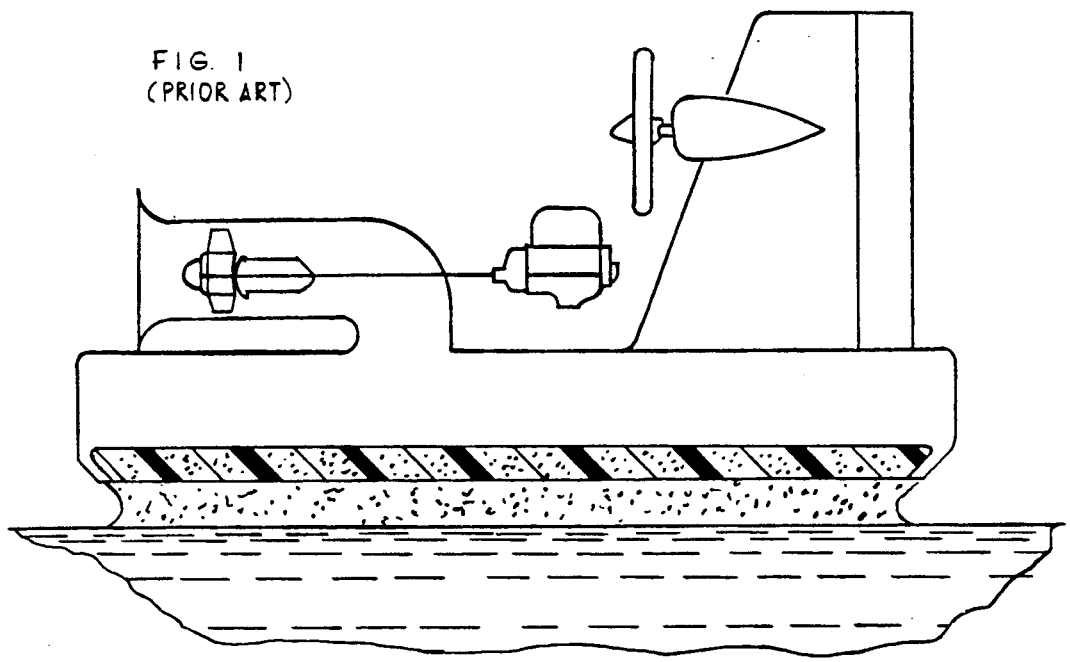
FIG. 1 is a diagrammatic simplified longitudinal sectional view through a conventional air cushion boat.
Figure 2:
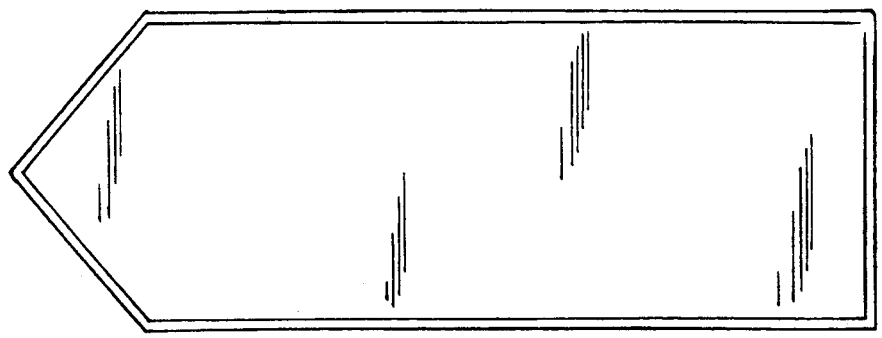
FIG. 2 is a horizontal sectional view taken on line 2—2 of FIG. 1.

Referring now to the drawings, there is shown mostly schematically in FIGS. 1 and 2 a typical air cushion boat 10 having a body 12, a deck 14, a bottom 16 and a hollow chamber 18 between the deck and the bottom which extends to the periphery of the body. The bottom 16 may be hollow and provided with flotation material 20, e.g., expanded foam. At the periphery of and communicating directly with the chamber 18 is a substantially endless channel-like rigid nozzle 22 directed inward beneath the bottom 16. The chamber 18 is supplied with air under pressure by a fan 24 driven by an engine 26 and mounted in a funnel 28 which faces the prow 30 of the boat 10 and communicates with the chamber. Forward motion of the boat 10 may be achieved by an air propeller 32 driven by an engine 34 and directional control of the boat may be had by a vertical rudder 36 extending upward into the air behind the propeller.

Figure 4:
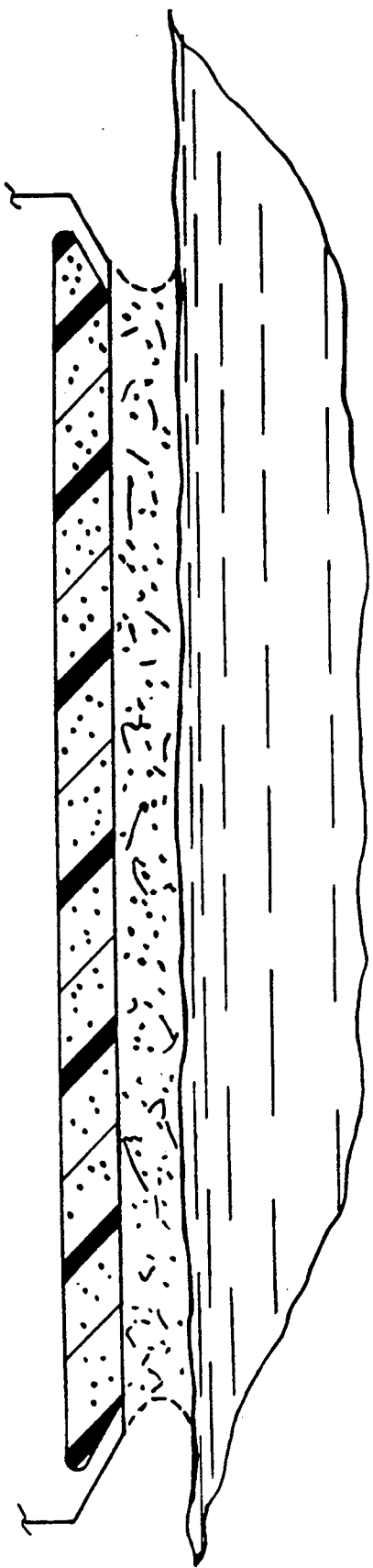
FIG. 4 is an enlarged cross-sectional view taken on line 4—4 of FIG. 3.

When the fan 24 is driven, it pushes air at a given rate, e.g. cu.ft./min., into the chamber 18 from which it exits through the nozzle 22 at a constant given speed and creates a cushion of air 38 beneath the bottom 16 at a pressure sufficient to raise the boat 10 above the surface 40 of the water on which the boat floats when the fan is not in operation. The cushion of air 38 beneath the boat 10 is contained by a curtain of air 42 which first exits from the nozzle 22 inward and downward beneath the boat and then curves downward and outward as shown in FIGS. 1 and 4. This curved air curtain 42 develops a centrifugal force, represented by the formula $$CF = W^2/R,$$

that creates and contains the air cushion 38 at a given pressure. In the formula CF is centrifugal force, W = speed or velocity of the air exiting from the nozzle 22 and R is the radius of curvature of the curtain 42. W remains substantially constant for a given fan speed which is sufficient to make the centrifugal force CF high enough to develop sufficient cushion pressure to overcome the weight of the boat 10 and raise it. As the boat 10 raises, R will increase to a point where the centrifugal force CF and the corresponding pressure of the cushion decreases sufficiently to balance the weight of the boat.

When the craft 10 travels over uneven or rough water, however, there will be local variations of R about the periphery of the craft, i.e. in the curtain 42, with consequent transient local variations of cushion pressure about the periphery of the craft. Those pressure variations may cause the craft 10 to tilt, pitch and roll, rock, etc., the severity of which will depend on roughness of the water, speed of the craft, etc.

Figure 5:
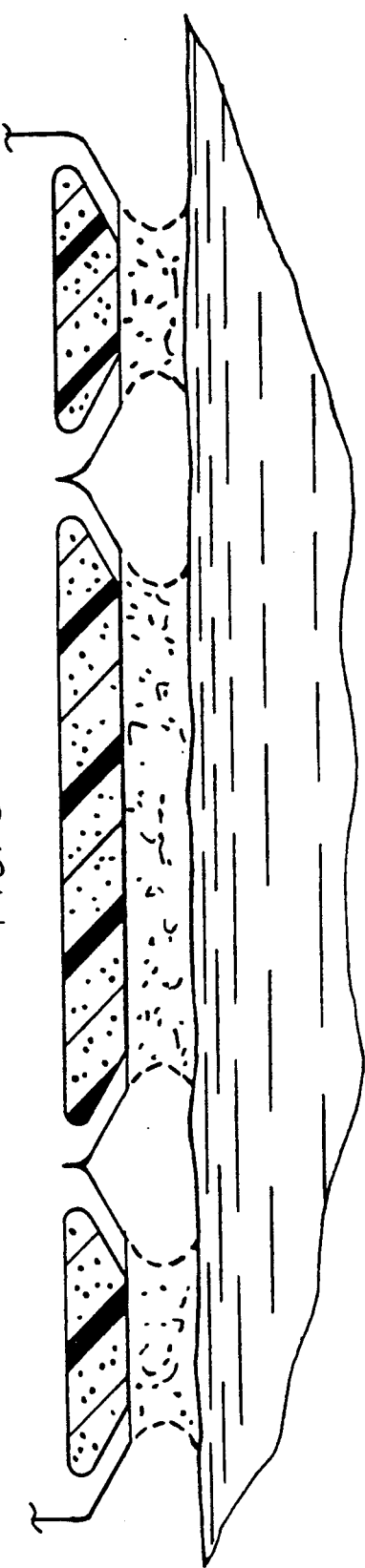
FIG. 5 is an enlarged cross-sectional view taken on line 5—5 of FIG. 3.
Figure 1:
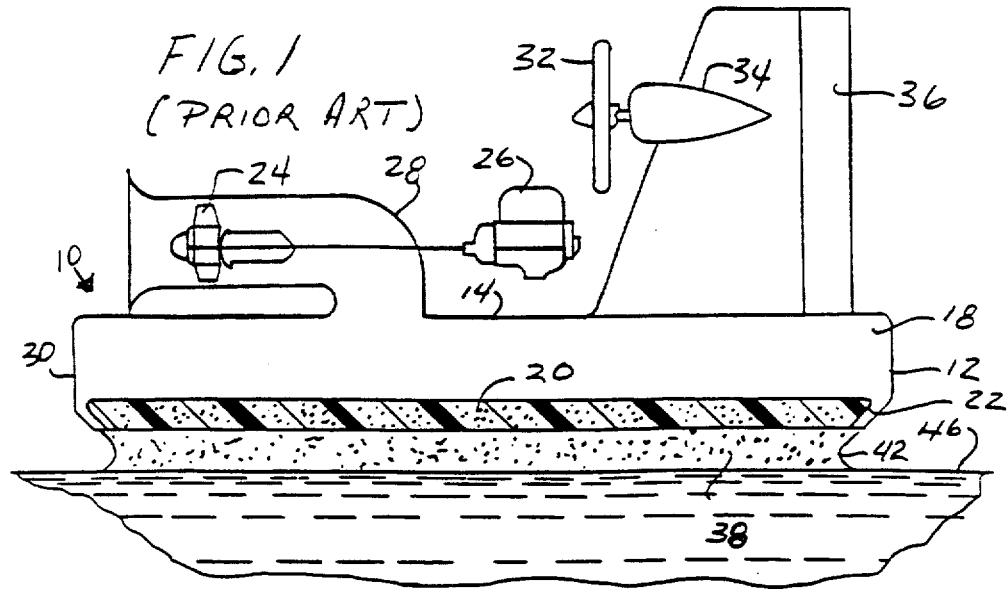
Figure 2:
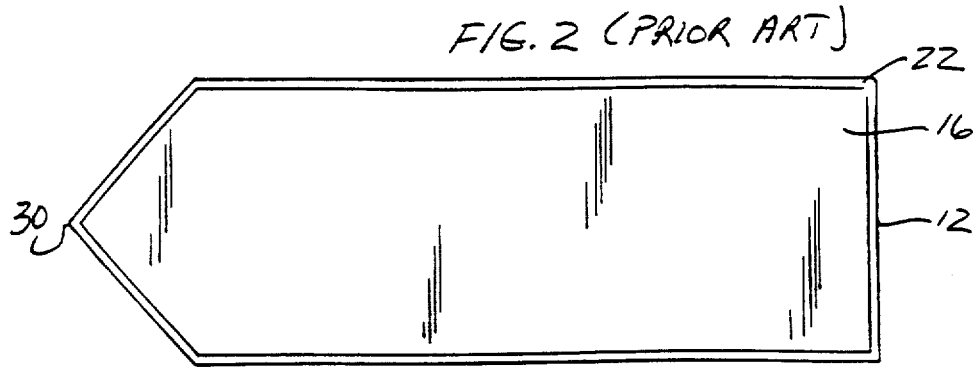
Figure 3:
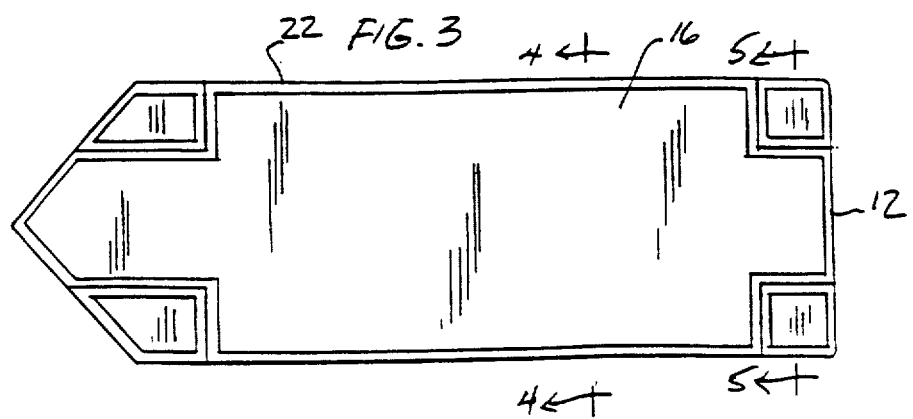

This invention makes use of the above inherent characteristics of an air cushion, created by a rigid nozzle, as described above, i.e. the closer to the surface over which such an air cushion vehicle travels the greater the centrifugal force and consequently the greater the pressure of the cushion. Thus, the air cushion boat 10 shown in FIGS. 4 and 5 has small independent stabilizing air cushions 44 arranged symmetrically about fore and aft and transverse axes of the boat. As shown, there are four such stabilizing cushions 44, two fore and two aft, arranged at about the four corners of the boat 10. Each cushion 44 is created and contained by an air curtain 46 emitted from a substantially endless corresponding rigid nozzle 48 directed downward and inward and supplied with air under pressure from the chamber 18. Preferably, the two aft stabilizing air cushions 44 and their creating nozzles 48 are of the same size and plan configuration, and the same is true of the two forward cushions and their creating nozzles, but those factors can be varied to meet particular needs or circumstances. The nozzles 48, that is their rims or mouths, are on the same level as the primary nozzle 22.

Figure 3:
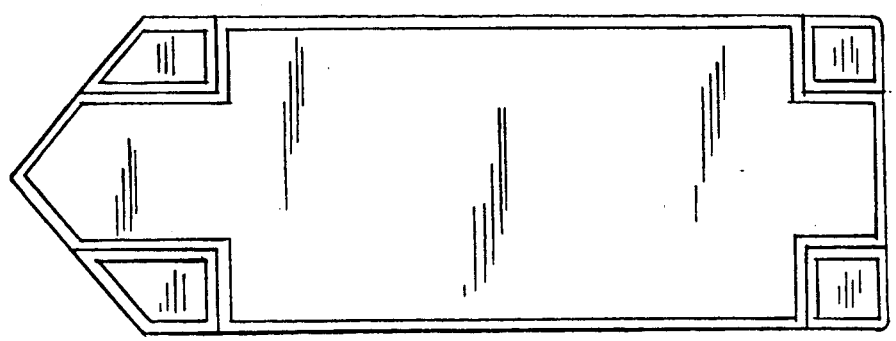
FIG. 3 is a view corresponding to FIG. 2 of an air cushion boat embodying this invention.

To accommodate the nozzles 48, the plan view configuration of the nozzle 22 for the primary or central air cushion 38 is modified, as shown in FIG. 3, to be set back from the periphery of the boat 10 and conform to the contour of the adjacent portions of the stabilizing nozzles 48. Those may be generally rectangular in plan, as shown, or any other practical configuration, e.g. round, oblong, etc., but preferably, the nozzles 48 conform to the contour of the adjacent portions of the periphery of the craft 10.

Thus, if the craft 10 leans to one side, i.e. to the left, the two stabilizing nozzles 48 on the left are brought closer to the surface 40, with the rims of those nozzles being at all locations thereabout, generally or about equi-distant from the surface. Thus, the pressure in the two stabilizing cushions 44 created by those two nozzles 48 will rise and tend to raise the left side of the craft 10 and level it. The same effect, of course, will be had by the two fore or two aft nozzles 48 if the craft 10 pitches, i.e. the bow or aft end dips down. If it is desired to stabilize the craft 10 against only leaning to the right or the left, only two stabilizing nozzles need be had arranged one on each side in line transversely and preferably at about midpoint the length of the craft. To stabilize against only pitching, again only two stabilizing nozzles need be had, one fore and one aft in line longitudinally and preferably at about the transverse midpoint of the craft 10.

The essence of the invention is that a small air cushion, unlike a large air cushion, has all points of its periphery, i.e. of the creating nozzle, substantially or about equi-distant from the surface over which an air cushion vehicle travels even though the craft leans sideways or pitches. Even though all the points or locations about the periphery of the rim of the nozzle creating a small cushion are not substantialy equi-distant from the underlying surface, they are more equi-distant than all points of the rim of the nozzle creating a large cushion when the craft leans sideways or pitches. Thus, a small cushion, properly placed, uses its inherent characteristics to tend to stabilize a craft.

It thus will be seen that the objects and advantages of this invention have been fully and effectively achieved. It will be realized, however, that the foregoing specific embodiment has been disclosed only for the purpose of illustrating the principles of this invention and is susceptible of modification without departing from such principles. Accordingly, this invention includes all embodiments encompassed within the spirit and scope of the following claims.

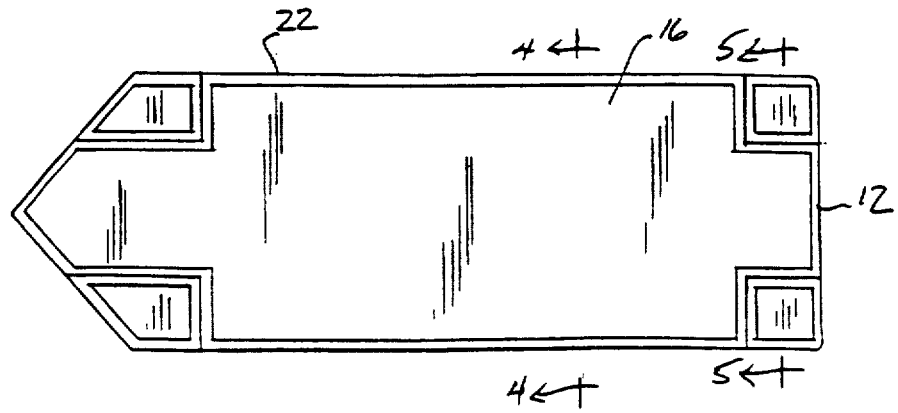

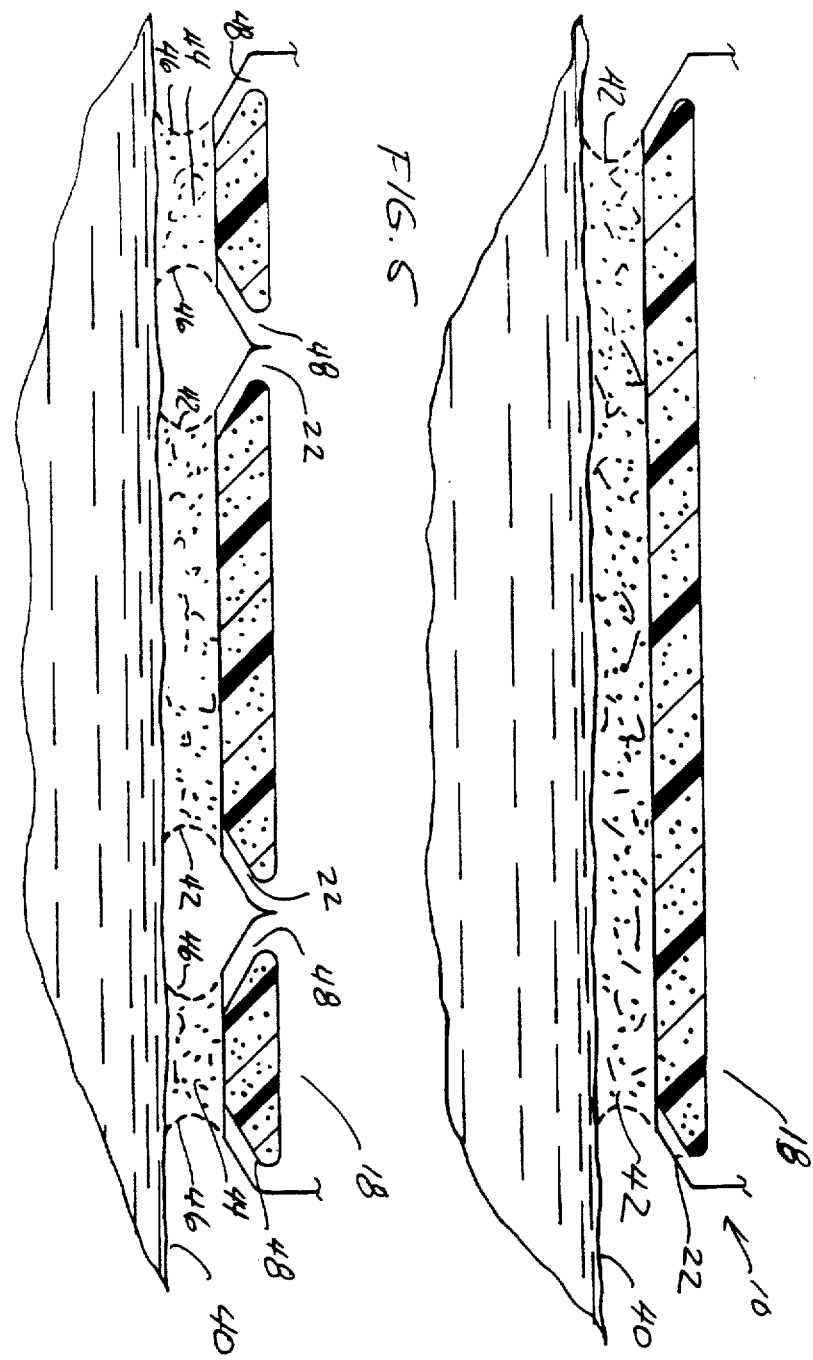

What is claimed is:

1. A stabilized air cushion vehicle adapted to travel over a surface comprising:
   a body;
   first means on said body for creating therebeneath a central primary air cushion including a central peripheral air curtain peripherally surrounding said central cushion for creating and containing said central cushion;
   second means on said body for creating therebeneath at least two secondary stabilizing air cushions on generally opposite sides of said central cushion including secondary peripheral air curtains peripherally surrounding said secondary cushions for creating and containing the respective secondary cushions, each of said secondary peripheral air curtains being spatially separated from said central peripheral air curtain and each of said secondary cushions being smaller in plan view than said central cushion.

2. The vehicle defined in claim 1 wherein the first and second means include a common supply of air under pressure.

3. The vehicle defined in claim 1 wherein the vehicle has a front, back and two sides and the secondary cushions are located at said front and back.

4. The vehicle defined in claim 1 wherein the vehicle has a front, back and two sides and the secondary cushions are located at said two sides.

5. The vehicle defined in claim 1 wherein the vehicle is elongated in plan view and there are at least four secondary cushions located generally symmetrically about the longitudinal and transverse axes of the vehicle.

6. The vehicle defined in claim 1 wherein the secondary air cushions are of generally the same size and plan configuration.

7. A stabilized air cushion vehicle adapted to travel over a surface comprising:
   a body having a substantially imperforate central primary underside area and at least two substantially imperforate secondary underside areas, smaller than said central area, on substantially opposite sides of said central area;
   first means on said body defining a substantially endless channel-like primary nozzle peripherally surrounding said central area and peripherally directed inwardly beneath said central area and connected to a supply of air under pressure to create and contain a primary air cushion under said central area;

second means defining at least two substantially endless channel-like secondary nozzles on said body, each spatially separated from said primary nozzle, each peripherally surrounding a corresponding one of said secondary areas, and each peripherally directed inwardly beneath a corresponding one of said secondary areas which it surrounds, said secondary nozzles are connected to a supply of air under pressure to provide a secondary air cushion under each of said secondary areas, whereby since the pressure of each of said secondary air cushions varies inversely with the height of the secondary area above the surface over which the vehicle is traveling said vehicle will tend to righten if said heights of said secondary areas become substantially unequal.

8. The vehicle defined in claim 7 wherein the primary and secondary nozzles are connected to the same supply of air.

9. The vehicle defined in claim 7 wherein the vehicle has a front, back and two sides and the secondary nozzles are at the front and back.

10. Vehicle defined in claim 7 wherein the vehicle has a front, back and two sides and the secondary nozzles are at the sides.

11. The vehicle defined in claim 7 wherein the vehicle is elongated in plan view and there are at least four secondary areas located generally symmetrically about the longitudinal and transnverse axes of the vehicle.

12. The vehicle defined in claim 7 wherein the secondary areas are of generally the same size and plan configuration.

13. The vehicle defined in claim 7 wherein the primary and secondary nozzles have rims, and said rims are on substantially the same level.

* * * * *

UNITED STATES PATENT AND TRADEMARK OFFICE
CERTIFICATE OF CORRECTION

PATENT NO. : 5,195,602　　　　　　　　　　　　　　Page 1 of 4

DATED　　　: March 23, 1993

INVENTOR(S) : Carl W. Weiland

It is certified that error appears in the above-indentified patent and that said Letters Patent is hereby corrected as shown below:

The title page, should be deleted to appear as per attached title page.

The sheets of drawings consisting of figures 1-5, should be deleted to be replaced with the attached figures 1-5.

Signed and Sealed this

Eleventh Day of January, 1994

Attest:

BRUCE LEHMAN

Attesting Officer　　　　　Commissioner of Patents and Trademarks

United States Patent [19]
Weiland

[11] Patent Number: 5,195,602
[45] Date of Patent: Mar. 23, 1993

[54] STABILIZED AIR CUSHION VEHICLE

[76] Inventor: Carl W. Weiland, 1769 Golfridge Dr., Bloomfield Hills, Mich. 48302

[21] Appl. No.: 736,637

[22] Filed: Jul. 26, 1991

[51] Int. Cl.⁵ .............................................. B60V 1/12
[52] U.S. Cl. ..................................... 180/118; 180/121
[58] Field of Search ............... 180/126, 121, 116, 117, 180/118

[56] References Cited

U.S. PATENT DOCUMENTS

| | | | |
|---|---|---|---|
| 3,373,836 | 3/1968 | Chaplin | 180/118 |
| 3,412,956 | 11/1968 | Cockerell | 180/118 X |
| 3,438,457 | 4/1969 | Guienne et al. | 180/121 |
| 3,563,333 | 2/1971 | Beardsley | 180/118 |
| 3,811,527 | 5/1974 | Pont et al. | 180/121 |
| 3,826,330 | 7/1974 | Midolo et al. | 180/116 |

Primary Examiner—Margaret A. Focarino
Assistant Examiner—Kevin Hurley
Attorney, Agent, or Firm—Cushman, Darby & Cushman

[57] ABSTRACT

An air cushion vehicle has a substantially-endless downward and inward directed rigid primary nozzle supplied with air under pressure for producing an air curtain that creates and confines a central primary air cushion beneath the vehicle which mainly supports it. The vehicle also has at least two substantially-endless downward and inward directed rigid secondary nozzles arranged on generally opposite sides of the primary nozzle and each supplied with air under pressure for producing an air curtain that creates and confines a stabilizing air cushion beneath the vehicle smaller than the primary air cushion. The two stabilizing cushions are preferably of the same size and shape and each smaller than the primary cushion. When the vehicle leans or dips toward one of the stabilizing cushions when travelling over a surface, e.g. land or water, the pressure of that one stabilizing cushion increases and tends to push the vehicle back up to a level position.

13 Claims, 2 Drawing Sheets